US007925245B1

(12) United States Patent
Soelberg et al.

(10) Patent No.: US 7,925,245 B1
(45) Date of Patent: Apr. 12, 2011

(54) SYSTEM AND METHODS FOR WIRELESSLY PROVIDING UPDATE INFORMATION OF AND DOWNLOADING PREVIOUSLY OBTAINED CONTENT TO A NEWLY ACTIVATED MOBILE STATION

(75) Inventors: Emily Lyons Soelberg, Atlanta, GA (US); Herman Chien, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 874 days.

(21) Appl. No.: 11/687,281

(22) Filed: Mar. 16, 2007

(51) Int. Cl.
*H04L 29/08* (2006.01)
(52) U.S. Cl. .................. 455/414.4; 455/466; 455/412.2; 717/176
(58) Field of Classification Search ............... 455/412.1, 455/414.1, 466; 717/176
See application file for complete search history.

(56) References Cited

U.S. PATENT DOCUMENTS

| 5,887,253 | A | 3/1999 | O'Neil et al. ................. 455/418 |
| 6,970,602 | B1* | 11/2005 | Smith et al. ................... 382/232 |
| 2006/0008256 | A1* | 1/2006 | Khedouri et al. ............. 386/124 |
| 2007/0192401 | A1* | 8/2007 | Weakliem et al. ............ 709/202 |
| 2008/0214163 | A1* | 9/2008 | Onyon et al. ............. 455/414.2 |

* cited by examiner

*Primary Examiner* — Nick Corsaro
*Assistant Examiner* — Quan M Hua
(74) *Attorney, Agent, or Firm* — Woodcock Washburn LLP

(57) ABSTRACT

A system and method for merchandizing content to wireless subscribers that have upgraded their mobile station or service is disclosed. The wireless carrier maintains a database of identifying data for content downloaded to subscribers' mobile stations. When a subscriber upgrades his or her mobile station the wireless carrier searches the database for previously downloaded content, identifies the equivalent content that is compatible with the new mobile station and provides the information of available equivalent downloads to the mobile station.

21 Claims, 6 Drawing Sheets

SYSTEM AND METHODS FOR WIRELESSLY PROVIDING UPDATE INFORMATION OF AND DOWNLOADING PREVIOUSLY OBTAINED CONTENT TO A NEWLY ACTIVATED MOBILE STATION

CROSS REFERENCE TO RELATED APPLICATIONS

This application is related by subject matter to the disclosures in the following commonly assigned application having application Ser. No. 11/687,210 filed on Mar. 16, 2007 entitled "Systems And Methods For Merchandising To Mobile Telephones," now U.S. Pat. No. 7,756,515 issued Jul. 13, 2010; application Ser. No. 11/687,246 filed on Mar. 16, 2007 entitled "Systems And Methods For Merchandising To Mobile Telephones"; and, application Ser. No. 11/687,313 filed on Mar. 16, 2007 entitled "Systems And Methods For Merchandising To Mobile Telephones." The disclosures of each application is incorporated by reference herein in its entirety.

FIELD OF THE INVENTION

This invention relates generally to the delivery of content and services to users of mobile stations (MS). More specifically, the present invention relates to systems and methods to provide users that change or upgrade their MS or service with an option to purchase services or content that they had previously purchased for their previous MS or service, or alternately to merchandize new content based on the new MS characteristics.

BACKGROUND OF THE INVENTION

The use of MS, e.g., cellular phones, personal data assistants (PDAs), laptop computers, Internet appliances, etc., has increased significantly over the years. Over two thirds of the U.S. population carry cellular phones, and many individuals use their cellular phone as their primary communication device.

MS such as cellular phones operate in conjunction with cellular networks, which are radio networks in which a geographic area is subdivided into a plurality of smaller areas called "cellulars." Each cellular is serviced by a fixed transmitter or base station usually referred to as a Base Transceiver Station or "BTS." The MS and a BTS communicate with each other via radio frequencies. Each base station distinguishes the signal from its transmitter from those of other transmitters.

There are a number of technologies and standards that are used in cellular communications around the world. One widely adopted standard is the global system for mobile communication (GSM) standard. In a cellular system operating under the GSM standard, the MS is equipped with a removable ID card called a Subscriber Identity Module (SIM) card that contains subscriber information. In the US, among the technology standards that were adopted for cellular systems are the IS-54, IS-136 and IS-95 standards. IS-54 and IS-136 are second-generation (2G) systems, also known as Digital AMPS (D-AMPS). IS-95 is a second generation (2G) mobile telecommunications standard that uses CDMA, a multiple access scheme for digital radio, to send voice, data and signaling data (such as a dialed telephone number) between mobile telephones and cellular sites. IS-95 is being supplanted in some networks by CDMA 2000 that uses CDMA to send voice, data, and signaling data (such as a dialed telephone number) between mobile phones and cellular sites. Numerous other standards are in use around the world. Irrespective of the standards and technologies utilized by a cellular system, they share certain common characteristics and many of the methodologies used in one type of cellular network may be adapted for other types of cellular networks.

An MS such as a cellular phone is associated with a set of identifiers or codes. These identifiers are used to identify the MS, the subscriber to the services provided to the MS and the service provider.

One of the identifiers is the System Identification Code (SID). The SID is a five digit number (i.e. 15 bit number). The SID is used by the MS to recognize whether they are in or outside of their home network.

Each MS will also have a unique number with the device. For example, each GSM and UMTS mobile phone has a unique International Mobile Equipment Identity (IMEI). The IMEI is used by the GSM network to identify valid devices. One of the uses of the IMEI is to prevent fraud. For example, if an MS is stolen or lost, the service provider may deny service to the device having the IMEI of the stolen device. Other unique identifiers for mobile devices may include Electronic Serial Numbers (ESN), or Mobile Equipment ID (MEID). The ESN are mainly used with AMPS and CDMA phones in the United States, compared to IMEI numbers used for GSM phones in Europe and elsewhere. Each time a call is placed, the IMEI or its equivalent is automatically transmitted to the base station so the wireless cellular carrier's mobile switching office can check the call's validity.

Associated with each MS is a Mobile Identification Number (MIN). The MIN uniquely identifies a mobile unit within a wireless carrier's network. The MIN often can be dialed from other wireless or wireline networks. The number differs from the electronic serial number (ESN), which is the unit number assigned by a phone manufacturer. MINs and ESNs can be checked electronically to help prevent fraud.

When the user of an MS powers on his or her device, the device searches for an SID on the control channel. The control channel is a special frequency, time slot, or code that the MS and base station use to exchange information, including information for call set-up and channel changing. When the MS receives the SID, the MS compares it to the SID programmed into the MS. If the SIDs match, the MS knows that the cellular it is communicating with is part of its home system. The MS then sends a data message to the cellular network that includes the MIN and the ESN. The user's MIN is compared with a table of all MINs in the network. The network determines if the MIN belongs to a home customer or to a visiting customer. If the user is a visiting customer, the cellular network where the visiting customer is located (First Network) sends a data message to the HLR in the visiting customers' home network (Second Network). When the HLR at the Second Network receives the message, it checks the MIN and the ESN. If the numbers are valid, the HLR at the Second Network records the location of the MS and returns a message containing the subscriber's feature list and calling restrictions to the First Network. When the First Network receives the message, it creates an entry in its Visitor Location Register (VLR) to store information about the visiting customer, including the MIN and ESN. The VLR is used by the visiting customer as long as they are registered in the First Network. If the visiting customer moves to another service area (a Third Network), the Third Network will initiate the registration process with the HLR in the Second Network. Consequently, the HLR in a customer's network always keeps track of an MS anywhere in the network. If the visiting customer turns off the MS, the visiting customer is "de-registered" in the First Network. When the MS is turned on again, the registration procedure is repeated.

Today, cellular phone users download a variety of content items to their mobile phones including ring tones, games, graphics, picture and video messaging, videos, applications, etc. Mobile carriers offer sales portals where customers can purchase this content and this has grown over the last several years to a billion-dollar industry. Users also typically upgrade their mobile phones every 18 months to 2 years. When a user obtains a new phone, the user must download the content again, even for applications that they subscribe to (like MobiTV). Today, there is not an easy way to guide phone upgraders to a list of past purchases that can be delivered to the phone easily. If a user had purchased 6 ring tones, 3 games, and 2 applications, they would have to manually search for each of those titles on the carrier's storefront and repurchase them on their new phone. In addition, because there are so many phone types, content providers often need to develop over 50 versions of a title (like the game Tetris) to ensure that it will work on every phone. To repurchase the game may involve purchasing a different version of the same title.

MS devices are becoming more flexible in their functionality and the functional capabilities of the devices may be modified on demand by way of things like plug-in memory dongles, CPU accelerators, input/output accessories such as keyboards or external speakers, etc. These changes to the functionality of the MS device offer a service provider an opportunity to market content relevant to the enhanced functionality. There is a need for a capability by the service provider to detect and identify the changes and provide content relevant to the new functionality.

SUMMARY OF THE INVENTION

The following summary is a simplified summary of the invention in order to provide a basic understanding of some of the aspects of the invention. This summary is not intended to identify key or critical elements of the invention or to define the scope of the invention.

This invention relates to a system for merchandising and delivering downloadable content to cellular phone users based on their past purchases and designed to be used when the user upgrades their mobile phone. The systems also include subsystems that receive an activation request from the subscriber's mobile station, identify a set of content previously downloaded by the subscriber, identify an equivalent set of content that is compatible with the mobile station; and provides the subscriber with information about the equivalent set of content.

The invention also relates to a method for merchandising content to an MS user by determining when a subscriber has changed an MS, identifying content previously downloaded by the user in their old MS, determining the equivalent content for the new MS, and providing the user with information about the equivalent content.

Another methodology for merchandising previously downloaded content is also provided by searching a subscriber database to determine if any subscriber has activated a new MS. If the subscriber has activated a new MS, content previously downloaded by each subscriber that has activated a new mobile station is identified, and information about the previously downloaded content is sent to the new MS.

One aspect of the invention is the ability to distinguish when a mobile phone user who is browsing content on a carrier mobile storefront has recently upgraded his or her phone and to merchandise to them a list of their prior purchases that can be repurchased for installation on the new phone.

Another aspect of the invention is the merchandizing of content based on changes to the user's mobile station (mobile phone) specifications.

Other and further aspects of the present invention will become apparent during the course of the following description and by reference to the attached drawings.

DETAILED DESCRIPTION OF ILLUSTRATIVE EMBODIMENTS

Figure 1:
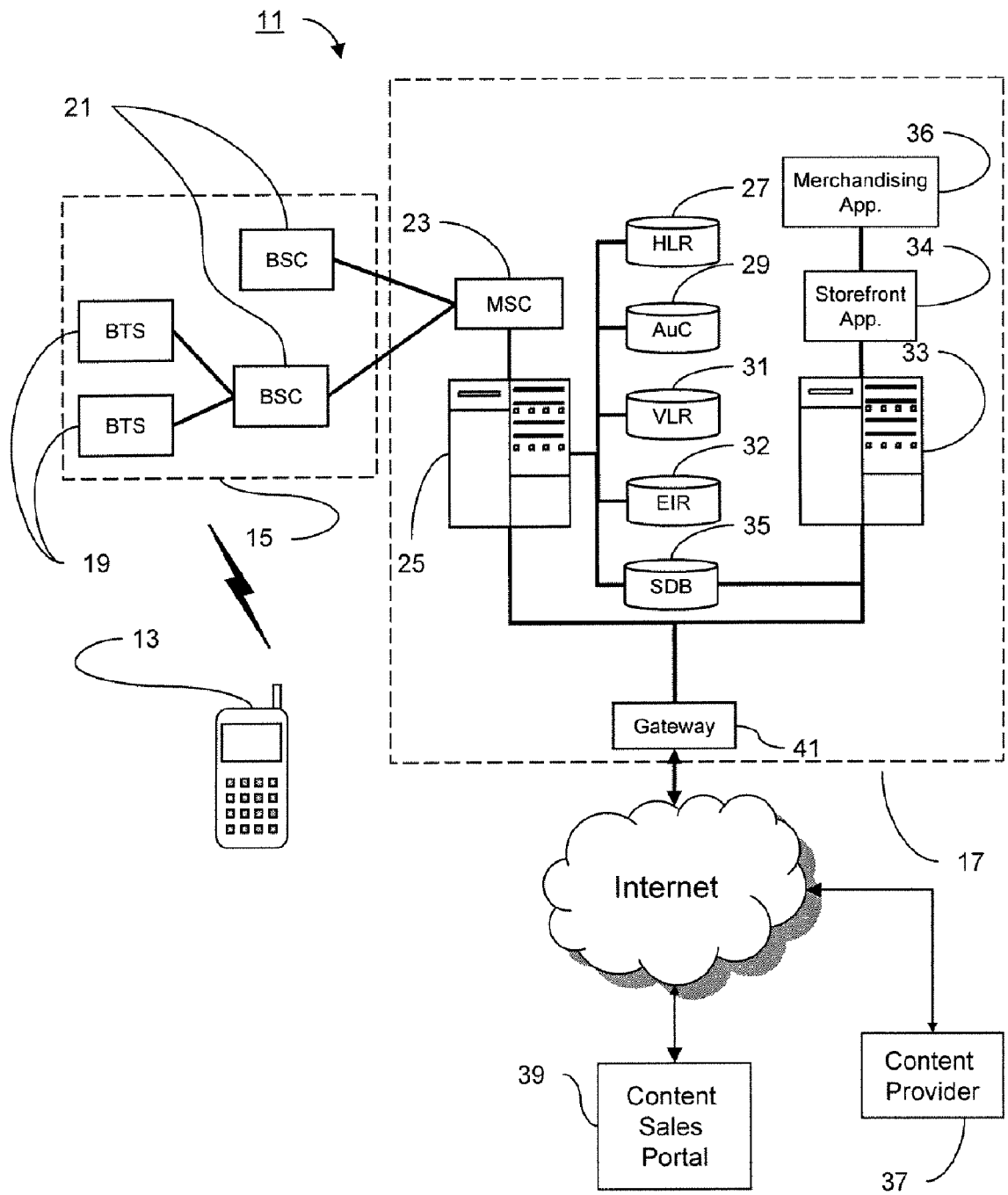
FIG. 1 illustrates the components of a typical cellular network.

Illustrated in FIG. 1 is a cellular communication system 11 for merchandising prior download purchases to a plurality of MS 13. The system 11 includes a plurality of MS 13, a base station subsystem 15, and a network subsystem 17. The components described in FIG. 1 for the base station subsystem 15 and network subsystem 17 are illustrative of just one example of a cellular network. There are a number of different digital cellular technologies that have been developed and are presently commercially employed. These technologies include: Global System for Mobile Communications (GSM), General Packet Radio Service (GPRS), Code Division Multiple Access (CDMA), Evolution-Data Optimized (EV-DO), Enhanced Data Rates for GSM Evolution (EDGE), UMTS, HSDPA, Digital Enhanced Cordless Telecommunications (DECT), Digital AMPS (IS-136/TDMA), and Integrated Digital Enhanced Network (iDEN). Although these technologies may employ different components, it would be readily apparent to one of ordinary skill in the art that the systems and methods described below could be employed with any of the wireless technologies.

In one example of a wireless cellular system the exchange of data between the wireless mobile devices and the wireless cellular network is accomplished utilizing one of a number of standard formats through the wireless network including base station subsystem 15 and network subsystem 17. In an exemplary system, a typical base station subsystem 15 includes a plurality of base transceiver stations (BTSs) 19 served by a Base Station Controller (BSC) 21. The BTSs 19 are transmitter/receivers used to transmit and receive signals over the radio interface section of the network. The BSC 21 controls communication between a group of BTSs 19 and a Mobile Switching Center (MSC) 23. The BSC 21 also performs radio signal management functions for the BTSs 19, managing functions such as frequency assignment and handoff. The MSC 23 which sets up and maintains calls made over the network. In a GSM system a network switching subsystem would perform a similar function as the MSC 23. If the cellular network uses General Packet Radio Service (GPRS) the BSC 21 may be a Serving GPRS Support Node (SGSN). The BTS 19 defines a cellular and handles the radio link protocol with the wireless mobile devices 13. The BSC 35 manages the radio resources for one or more BTS devices 19 as well as radio channels set up, frequency hopping, and handovers. The BSC 21 connects the MS 13 with the MSC 23 of the network subsystem 17. As stated previously this is just one example of the components of an exemplary cellular system. The present invention is not limited to the type of system utilized or the standards used by the system. It would be apparent to one of ordinary skill in the art to implement the methods and systems described in a variety of cellular systems using various standards.

One component of the example network subsystem 17 is the MSC 23. The MSC 23 acts as a switching node and additionally provides all of the processes needed to handle an MS 13, such as registration, authentication, location updating, handovers, and call routing. Also included in the network subsystem 17 would be one or more processing units 25 such as a server. Information from the MSC 23 is processed by the processing unit 25. Also accessible by the processing unit 25 is a home location register (HLR) 27. The HLR 27 is a database that contains data relating to the local subscriber and may include subscriber information such as directory number, electronic serial number of the MS 13, and services or features the subscriber is assigned. The HLR resides in the wireless network that contains service profiles and is used to check the identity of a local subscriber. The network subsystem 17 also includes an authentication center (AuC) 29. The AuC 29 is used during initial access to authenticate the user by means of an ESN, SID and MIN. The AuC 29 maintains a list of ESNs and MINs for each subscriber and network. The AuC 29 is used in the verification process to assure that a wireless device and its user are compatible with and authorized to access a wireless network. This process is accomplished through transmission of identifying data at the time of connection. The network subsystem 17 also includes a visitor location register (VLR) 31 that includes information from other systems' HLRs necessary to deliver the subscribed services and control the calls for each MS 13 within a specified geographical area. The VLR 31 is a network database that holds information about roaming wireless customers.

Another database included in the network subsystem 17 is the equipment identity register (EIR) 32. The EIR 32 contains a list of all valid MSs 13 on the network. Also illustrated in FIG. 1 is a storefront server 33 that may be connected to the server 25 and which accesses a storefront application 34. The storefront application 34 is a conventional electronic commerce application that is used to merchandize products by the operator of the system 11. For example, a cellular network operator may maintain a storefront application 34 for the sale of cellular phones, service plans, ringtones, games, accessories and other items. Associated with the storefront server 33 and the storefront application 34 is a storefront database 35 that stores data relating to transactions handled by the storefront application 34. The system also includes a merchandising application 36 to implement the methodologies described in greater detail below.

Although in the example illustrated in FIG. 1, there are shown two servers providing different functions, it would be readily apparent to one of ordinary skill in the art that a single server, or multiple servers may be employed to accomplish the same results. Similarly, multiple databases are illustrated, but these may be combined into one or more database depending on the system architecture utilized by the service providers.

The cellular communications system 11 may also includes a content provider 37 and a content sales portal 39 connected to the network subsystem 17 through a network such as the Internet. Content providers 37 may include independent sources of content such as games, ringtones and the like. The content sales portal may be an electronic commerce site where the user of the MS 13 may purchase content independent from the system operator. Content may be provided by the content provider 37 to a content sales portal 39 or alternately the content may be provided to the network subsystem 17 of the cellular service provider through a gateway 41 and transmitted through the BTS 19.

Figure 2:
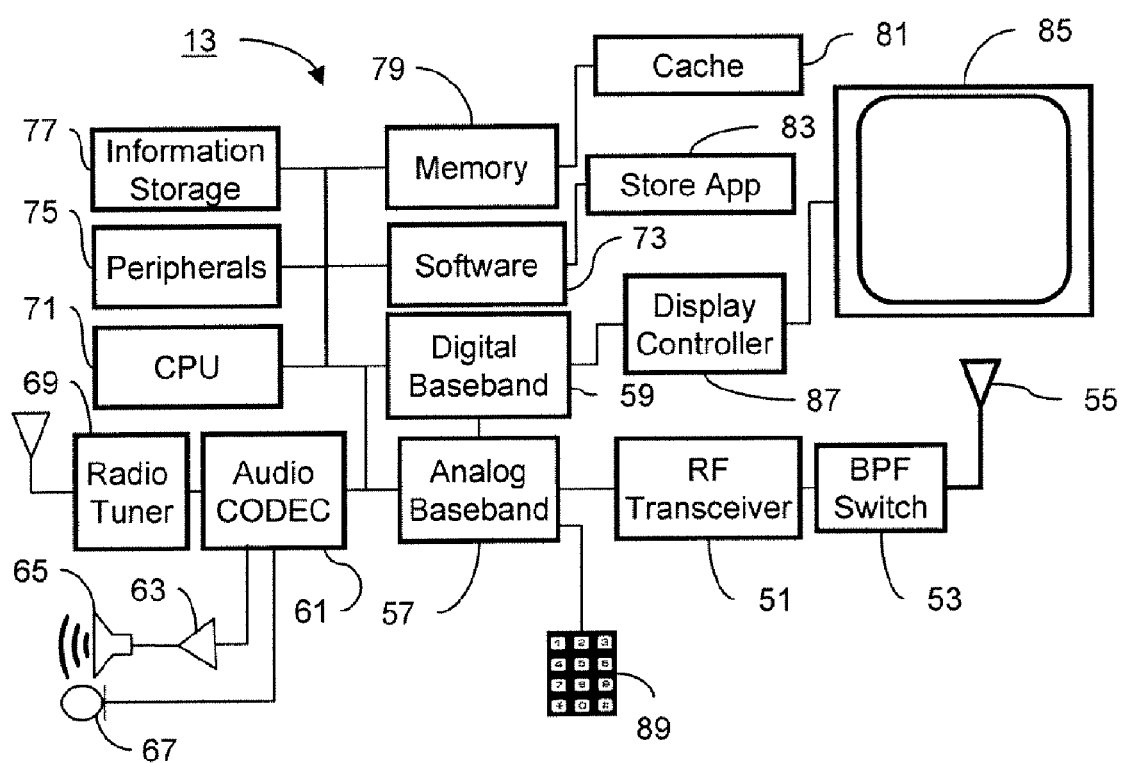
FIG. 2 illustrates a schematic of the components of a mobile station in accordance with the present invention.

As illustrated in FIG. 2, the MS 13, (e.g. a cellular phone) includes a number of subsystems to enable the device to function both as a communication device and a multimedia display device. The wireless mobile devices 13 include an RF transceiver 51 that is capable of receiving and sending radio transmissions to the BTS 19 through a BPF Switch 53 and antenna 55. The receive signal from the BTS 19 is received by the RF Transceiver 51 and converted to an analog baseband signal by the analog baseband processor 57. The analog baseband signal is converted to a digital baseband signal by the digital baseband processor 59. The analog baseband signal may also be input to Audio CODEC 61, amplified by amplifier 63, and output to speaker 65. Conversely, an audio input signal from microphone 67 may be converted to an analog baseband signal by analog baseband processor 57 and into a digital baseband signal by digital baseband processor 59. The MS 13 may also include a radio tuner 69 capable of receiving signals from radio broadcast stations or satellite rebroadcast stations. The MS 13 also includes a microprocessor (CPU) 71 with the necessary logic to provide the control functions for the device. The microprocessor may access software 73 including instructions to provide the control for the MS 13. The MS may include peripherals 75 such as a camera, connections for downloading information and similar devices. The MS typically includes an information storage subsystem 77 that stores the key identifying a mobile phone service subscriber, as well as subscription information, saved telephone numbers, preferences, text messages and other information. In GSM systems the information storage subsystem would be Subscriber Identity Module (SIM card). The equivalent of a SIM in UMTS is a Universal Subscriber Identity Module (USIM). The MS may also include additional memory 79 that may include cache memory 81. The software 73 may include an application to handle the storefront functionality of the MS 13, enabling the user to connect to the cellular service provider storefront to order downloads of content. A display 85 is coupled to the digital baseband processor 59 though a display controller 87. The display controller 87 may provide menu functionality to the display 85 so that the user may select from variety of options. This is facilitated with an input device such as a key pad 89, or by providing the display 85 with touch screen functionality.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein. When the program code is loaded into and executed by a central processing unit (e.g. the browser installed in the MS 13), the central processing unit becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Figure 3:
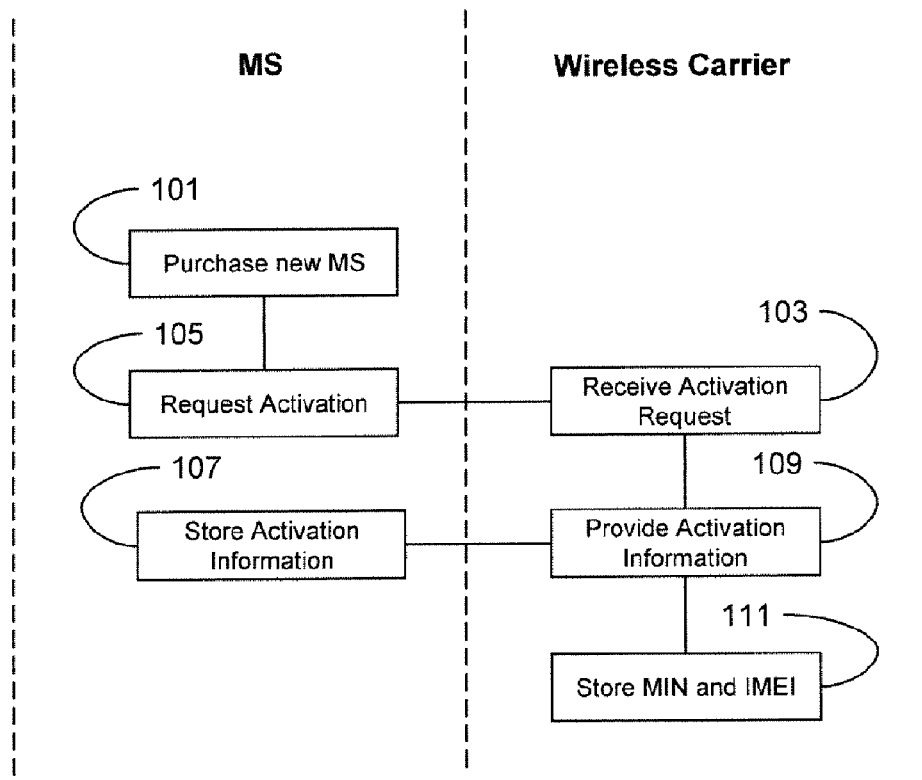
FIG. 3 is a logic flow diagram illustrating a typical mobile station activation process.

Illustrated in FIG. 3 is a typical process for activating an MS 13 such as a cellular phone. The user purchases a new cellular phone (method element 101) and request activation from the wireless carrier (method element 105). The request for activation would typically include communicating the ESN number (or IMEI) to the cellular network. This can be done at a retail establishment, by calling a cellular network customer service representative, or by accessing a cellular network web site, entering the ESN and requesting activation. The cellular network will typically conduct credit checks for new service accounts. In some cases, the activation can take place over the air (OTA). A user can buy a phone from any retail location, open the box, punch in the customer-service number on the handset and relay the appropriate credit information. Then, once the cellular carrier verifies the credit information and approves the account, the phone number and other necessary information is sent OTA to the SIM card (method element 107).

Figure 4:
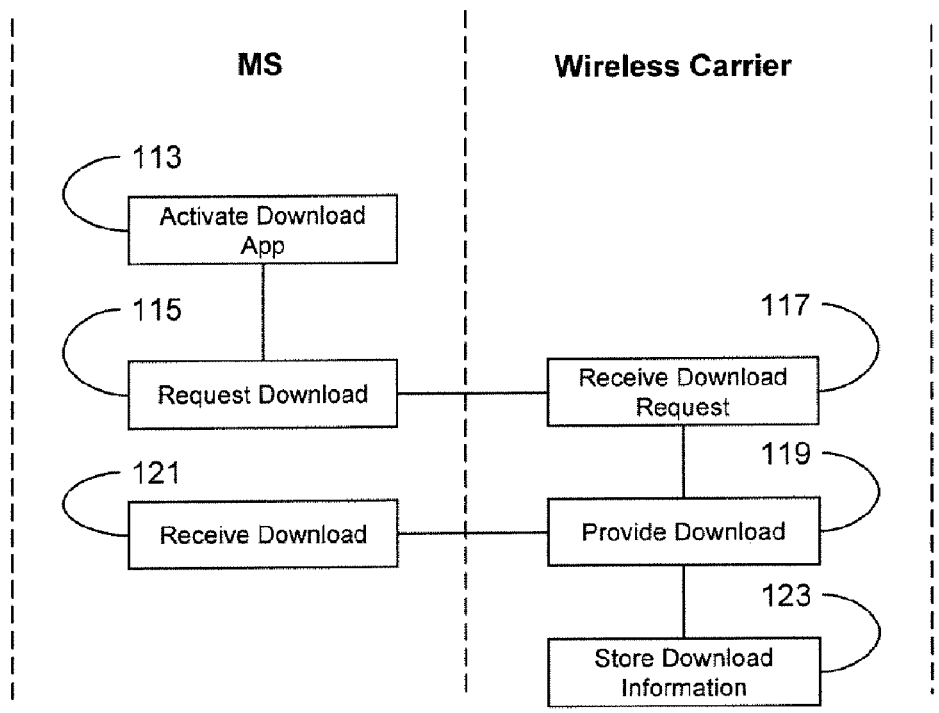
FIG. 4 is a logic flow diagram illustrating a typical mobile station content download process.

Illustrated in FIG. 4 is a methodology for downloading content, such as ring tones software etc., into an MS 13. The MS 13 may have an embedded application that provides a user interface to select content for downloading. The user would activate the download application (method element 113), select the content to be downloaded (method element 115) and transmits the request to the wireless carrier. The wireless carrier receives due download request (method element 117), processes the request and provides and transmits the selected content to the MS 13 (method element 119). The selected content is received by the MS 13 and is stored in memory accessible by the appropriate application. The wireless carrier will also store information relating to the content that is downloaded (method element 123) for billing and other purposes.

Figure 5:
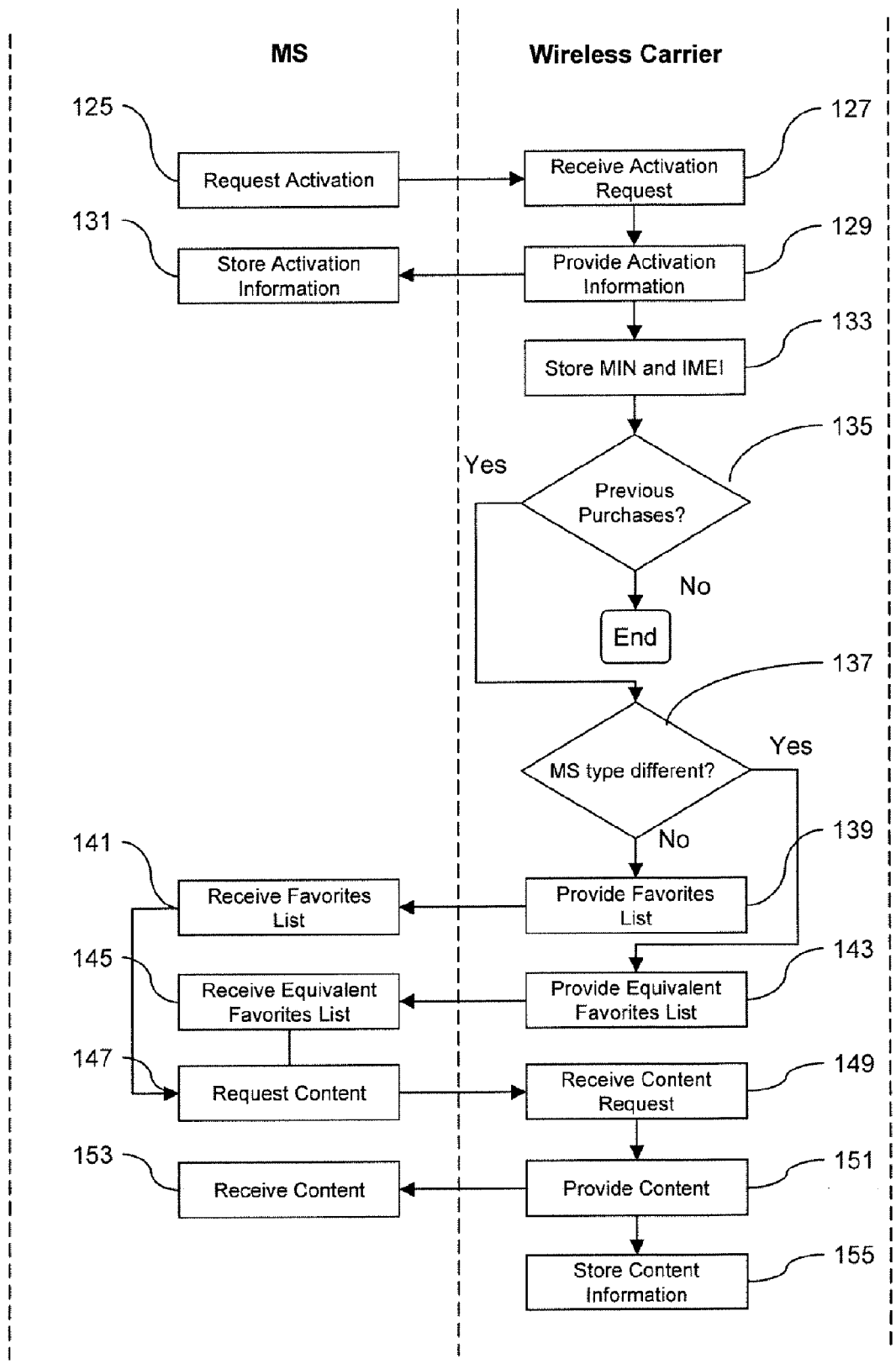
FIG. 5 is a logic flow diagram illustrating one embodiment of a method for merchandising prior download to a subscriber of a mobile station.

Illustrated in FIG. 5 is one embodiment of a method for merchandising prior download purchases to a mobile station in accordance with the present invention. In this example, the user of an MS 13 may upgrade their MS and request activation of the new MS 13 (method element 125). The activation methodology would proceed as illustrated in FIG. 3, with the wireless carrier receiving the activation request (method element 127, in certain cases providing activation information to the new MS (method element 129) and the MS receiving and storing the activation information (method element 131). After the activation steps, the wireless carrier stores the MIN and IMEI (or ESN) (method element 133) in a database. The wireless carrier then conducts a search of the SDB 35 to determine if the subscriber associated with the MIN has previously purchased content (decision node the 135). If the subscriber has previously purchased content, the wireless carrier determines whether the previous content was purchased for the same MS type as the MS presently being activated (decision node 137). For example, a cellular phone user may upgrade his or her cellular phone to a model that is compatible with previous content downloads. In that case the wireless carrier searches the database containing the list of previous downloads and provides the MS with a list of favorites (method element 139) from which the subscriber may select content to download. An example of such use may be a subscriber that has a ring tone that he or she has downloaded from a storefront provided by the wireless carrier and desires to use that ring tone in the upgraded cellular phone. Rather than having to search through all available ring tones in the wireless carrier storefront, the subscriber is provided with an easy way to configure the upgraded cellular phone similarly to the old cellular phone. The list of favorites may be provided in a number of ways, including data to be used by a user interface in the MS, or through an SMS or other type of message addressed to the MS. The subscriber would receive the message on their MS (method element 141) and would have the option to request content from the list of favorites (method element 147).

In some cases, the content that had been previously downloaded may not be compatible with the upgraded MS. In that case, if the MS type is different, the wireless carrier would determine an equivalent content that is compatible with the upgraded MS. This is done by searching a database that correlates content to MS types. The wireless carrier provides the MS with an equivalent favorites list (method element 143), that is received and displayed by the MS (method element 145). The subscriber may then make a request for the equivalent content (method element 147). The content request is received by the wireless carrier (method element 149) and the content is provided to the MS (method element 151). The content is then received by the MS (method element 153) for use by the subscriber.

Figure 6:
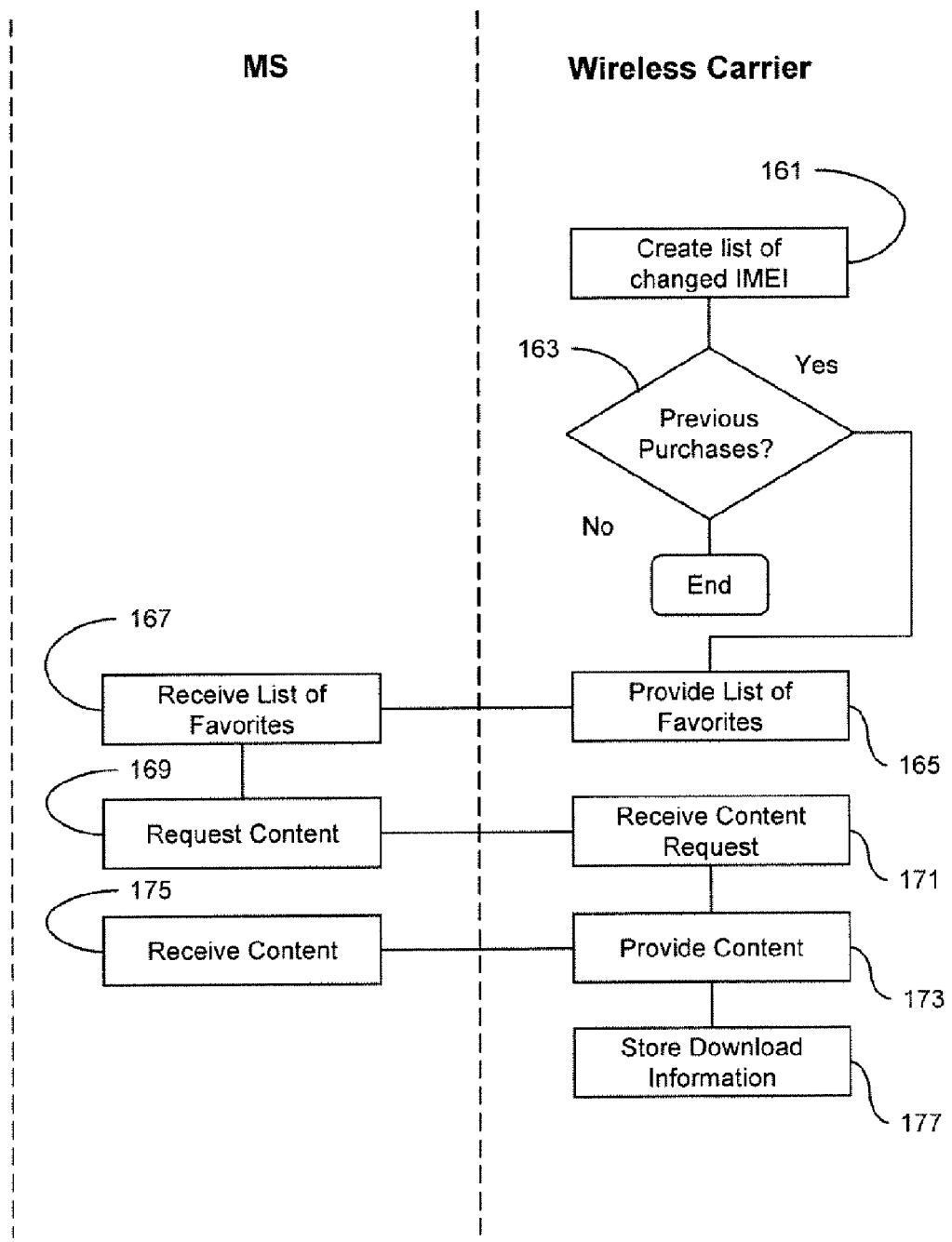
FIG. 6 is a logic flow diagram illustrating an alternate embodiment of a method for merchandising prior download to a subscriber of a mobile station.

FIG. 6 illustrates an embodiment in which the merchandising communication is triggered not by the activation of the MS but rather by a periodic search of the wireless carrier database to determine whether a subscriber has changed his or her MS (i.e. obtained an MS with a new IMEI or ESN). The wireless carrier would search the database associated with subscribers to determine whether a subscriber has changed the MS. The wireless carrier would then create a list of changed MSs (method element 161). A database of transactions associated with a subscriber is searched to determine if the subscriber has made previous purchases of content (decision node 163). If the subscriber has made previous purchases of content, the wireless carrier determines the equivalent content compatible with the MS associated with the new IMEI, and provides the MS with a list of favorites (method element 165). The list of favorites is received by the MS and is displayed by the appropriate application in the MS (method element 167). The subscriber may then the request some or all of the content that has been provided in the list of favorites (method element 169). The wireless carrier receives the request for content (method element 171) and transmits the contents to the MS (method element 173). The MS receives the content (method element 175 and stores the content for execution by the appropriate application in the MS. Information about the transaction is then stored (method element 177).

Figure 7:
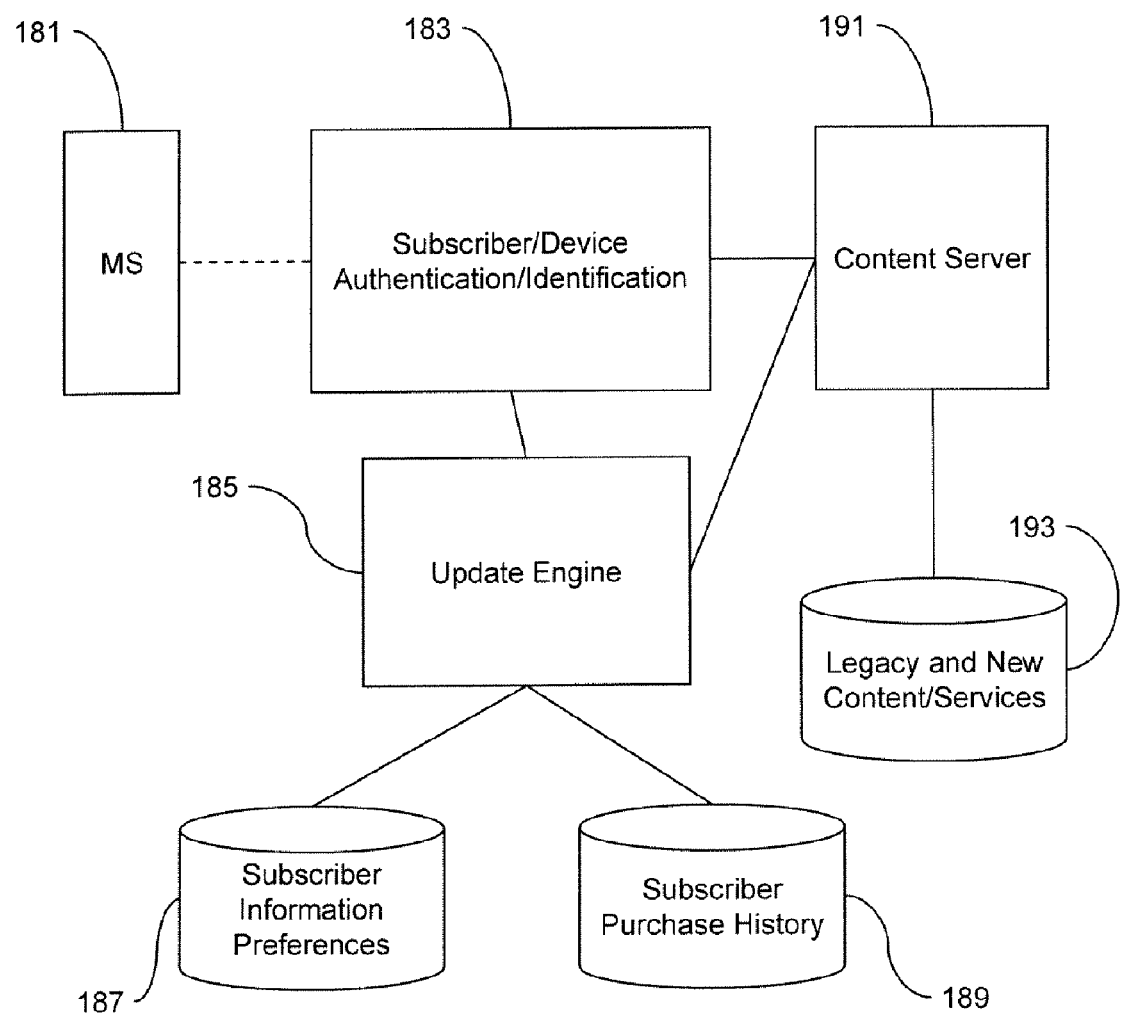
FIG. 7 is block diagram of an alternate embodiment of a method for merchandising to a subscriber of a mobile station based on changes in the mobile station.

FIG. 7 illustrates an alternate embodiment wherein changes to the functionality of the MS are communicated to the service provider, allowing the service provider to merchandize content relevant to the new functionality. A merchandising system 180 includes an MS 181 and an authentication node 183 that identifies and authenticates both the subscriber and the MS 181. The authentication node 183 grants the MS access to content, passes information about the MS 181 and the user or subscriber assigned to MS 181 to an Update Engine 185. The update engine 185 analyzes the current state of the MS 181 based on information received from the MS 181, data related to subscriber information preferences stored in a Subscriber Information Preference Data Store 187, and data relating to the subscriber purchase history stored in a Subscriber Purchase History Data Store 189. The Update Engine 185 determines whether a change to the MS 181 or the subscriber status or information warrants a new content offer, a suggestion to recover old content or any other content related communication. These decisions are used to shape the output of the Content Server 191 which passes an SMS messages, web pages, or other content to the MS 181 about available content and services based on the available legacy and new content and services stored in Legacy and New Content/Services Data Store 193.

The user (or subscriber) and the MS 181 must both be identified. A GSM network has ways of authenticating the user and carrying that identity through subsequent network processing. Identifying the device would entail capturing the IMEI (capturable at network registration) or the HTTP header user agent string (capturable at any browser session). A user agent is the client application used with a particular network protocol. When Internet users visit a web site, a UAstring is sent to identify the user agent to the server. This UAstring is incorporated into HTTP request, prefixed with User-agent: or User-Agent: and typically includes information such as the application name, version, host operating system, and language. The HTTP UAstring is also available in Java apps that use HTTP.

Information about the functionality of or changes to the MS 181 (including hardware or software) are detected by MS 181 and reflected as deltas announced in the HTTP header that modify the baseline capability described in the User Agent Profile (UAprofile). The UAprofile is a schema defined by the Open Mobile Alliance for detecting user agent types and device capabilities. The UAprofile schema specifies a set of base attribute names so that different MS manufacturers are able to use the same set of base attribute names to describe the features and capabilities of the MS. Examples of the type of information about MS hardware functionality that may be communicated through a UAprofile include the number of bits that a pixel uses to represent colors, the Bluetooth profiles supported by the MS, whether the screen of the mobile device can display colors, whether the mobile device can display images, and the like. Examples of the type of information about MS software functionality that may be communicated through a UAprofile include supported audio input encoders, acceptable MIME media types, the language preference of the user, whether the MS has the capability of running Java programs, and the like.

An example of the application of the system and method illustrated in FIG. 6 is an MS that is reconfigured to allow the user to plug the MS to external speakers. That change would be announced by the MS and the list of applications or services offered by the service provider could be extended to include more audio/video content. Additionally, if the user had previously purchased audio/visual content the service provider may offer to deliver higher fidelity video and audio to take advantage of the new functionality. Service offerings may include an offer to update insurance coverage when the system detects that the user has bought expensive accessories that they might want to insure, or if the user has a certain accessory the service provider may offer them a better accessory.

The above description of embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings provided herein of the invention can be applied to other networks, not necessarily the cellular network described above.

For example, as more content is pushed to telephone devices for various business reasons, content could be automatically updated. There are several push methods that could be use (WAP Push message which tells the browser to retrieve a URL to grab the content, Java push message which alerts a Java app to go one or more pieces of content, a native app, etc.) and where to deposit the content in a way that it remains usable in the same familiar way as before. This could also work in a more cooperative manner. The invention puts the burden on the network to identify things and deliver updated offers. The device could have an update agent that shares the workload. The network discovers a new device, notifies the agent on the device, the agent on the device then pulls the content based on local user-set preferences and/or previously known configurations stored in the network.

The various embodiments described above can be combined to provide further embodiments. Aspects of the invention can be modified, if necessary, to employ the systems and concepts of the various patents and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all systems that operate under the claims to provide a method for delivering text messages and multimedia content to a mobile station from a broadcast network in an efficient manner with improved delivery reliability. Accordingly, the invention is not limited by the disclosure, but instead the scope and definition of the invention is determined entirely by the following claims.

What is claimed is:

1. A method for offering an option to purchase content to a subscriber of a newly activated mobile station in a cellular network comprising:

maintaining a server containing a storefront application where subscribers may purchase content from content providers;

maintaining a storefront database associated with the storefront application that stores information about content purchased by the subscriber;

maintaining a subscriber database that stores information about the functionality of mobile stations associated with the subscriber;

maintaining a content database that stores information about content available for purchase by the functionality of the mobile station;

receiving at a gateway of said network a request to activate a new mobile station;

upon receiving said request, searching the subscriber database after activation of the new mobile station to determine a record of a second mobile station previously activated by the subscriber;

in response to finding record of said second mobile station, then searching the storefront database to determine content previously purchased by the subscriber and downloaded to said second mobile station;

upon finding said content previously purchased, then identifying alternate content equivalent to the content previously purchased by the subscriber;

determining that said alternate content is compatible with the newly activated mobile station; and determining, based on mobile station's functionality data from the subscriber database, that the newly activated mobile station's functionalities support the compatible alternate content: and sending an offer of the alternate content equivalent to the content previously purchased to the new mobile station.

2. The method of claim 1 wherein said method element of maintaining a storefront database comprises maintaining a database that stores information about content purchases by subscriber from a content provider that is independent from the cellular network.

3. The method of claim 1 further comprising determining if the content previously purchased is compatible with the newly activated mobile station of that subscriber.

4. The method of claim 3 further comprising searching the content database to identify content equivalent to the content previously purchased that is compatible with the newly activated mobile station.

5. The method of claim 4 wherein said method element of sending an offer of the alternate content comprises sending an offer of alternate content that is compatible with newly activated mobile station.

6. The method of claim 1 wherein said method element of sending an offer of the alternate content equivalent to the content previously purchased comprises sending a message including a link to a content portal where the subscriber may order the purchase of the content previously purchased for downloading to the newly activated mobile station.

7. The method of claim 1 wherein said method element of sending an offer of the alternate content equivalent to the content previously purchased further comprises sending instructions to the newly activated mobile station to display information about the content previously purchased.

8. A system for offering an option to purchase content to a subscriber of a newly activated mobile station in a cellular network comprising:
 a general purpose computer;
 a storage device associated with the general purpose computer; and
 at least one subsystem that:
  maintains a storefront application where subscribers may purchase content from content providers;
  stores information about content purchases by subscriber in a storefront database associated with the storefront application;
  stores information about the functionality of mobile stations associated with the subscriber in a subscriber database;
  stores information about content available for purchase by the functionality of mobile station in a content database;
 a network gateway to receive a request for activation from a newly activated mobile station;
 upon notified by said network gateway of said request for activation, said at least one subsystem is configured to:
  search the subscriber database after activation of the newly activated mobile station to determine a record of an another mobile station previously activated by the subscriber; and;
  search the storefront database, in response to finding said record of said second mobile station, to determine content previously purchased and downloaded to said second mobile station; and
  upon finding said content previously purchased identify alternate content equivalent to the content previously purchased; and
  determine that said alternate content is compatible with the newly activated mobile station; and
  determine, based on mobile station's functionality data from the subscriber database, that the newly activated mobile station's functionalities support the compatible with alternate content; and
  sends an offer of the alternate content equivalent to the content previously purchased to the newly activated mobile station.

9. The system of claim 8 wherein said subsystem that stores information about content purchased by the subscriber comprises a subsystem that stores information about content purchased by the subscriber from a content provider that is independent from the cellular network.

10. The system of claim 8 further comprising at least one subsystem that determines if the content previously purchased is compatible with the newly activated mobile station of that subscriber.

11. The system of claim 10 further comprising at least one subsystem that searches the content database to identify content equivalent to the content previously purchased that is compatible with the newly activated mobile station.

12. The system of claim 11 wherein said subsystem that sends an offer of the alternate content equivalent to the content previously purchased comprises at least one subsystem that sends an offer of alternate content that is compatible with the newly activated mobile station.

13. The system of claim 8 wherein said subsystem that sends an offer of the alternate content equivalent to the content previously purchased comprises at least one subsystem that sends a message including a link to a content portal where the subscriber may order the purchase of the content previously purchased for downloading to the newly activated mobile station.

14. The system of claim 8 wherein said subsystem that sends an offer of the alternate content equivalent to the content previously purchased further comprises at least one subsystem that sends instructions to the newly activated mobile station to display information about the content previously purchased.

15. A tangible computer readable medium for instructing a computer to offer content to a subscriber of a mobile station comprising instructions to:
 maintain a server containing a storefront application where subscribers may purchase content from content providers;
 store information about content purchases by subscriber in a storefront database associated with the storefront application;
 store information about the functionality of mobile stations associated with the subscriber in a subscriber database;
 store information about content available for purchase by the functionality of mobile station in a content database;
 receive and process a request to activate a new mobile station at a network gateway;
 upon receiving said request, search the subscriber database after activation of the newly activated mobile station to determine a record of a second mobile station previously activated by the subscriber;

in response to finding record of said second mobile station, search the storefront database to determine content previously purchased by the subscriber and downloaded to said second mobile station;

upon finding said content previously purchased, identify alternate content equivalent to the content previously purchased; and determine that said alternate content is compatible with the newly activated mobile station; and determine, based on mobile station's functionality data from the subscriber database, that the newly activated mobile station's functionalities are compatible with said alternate content; and send an offer of the alternate content equivalent to the content previously purchased to the newly activated mobile station.

16. The computer-readable medium of claim 15 wherein said instructions to store information about content purchased by subscriber comprises instructions to store information about content purchased by the subscriber from a content provider that is independent from the cellular network.

17. The computer-readable medium of claim 16 further comprising instructions to search the content database to identify content equivalent to the content previously purchased that is compatible with the newly activated mobile station of that subscriber.

18. The computer-readable medium of claim 17 further comprising instructions to identify content equivalent to the content previously purchased that is compatible with the newly activated mobile station.

19. The computer-readable medium of claim 15 wherein said instructions to send an offer of the alternate content comprises instructions to send an offer of alternate content that is compatible with newly activated mobile station.

20. The computer-readable medium of claim 15 wherein said instructions to send an offer of the alternate content comprises instructions to send a message including a link to a content portal where the subscriber may order the purchase of the content previously purchased to the newly activated mobile station.

21. The computer-readable medium of claim 15 wherein said instructions to an offer of the alternate content further comprises instructions to send instructions to the newly activated mobile station to display information about the content previously purchased.

* * * * *